United States Patent [19]
Barber

[11] 3,834,639
[45] Sept. 10, 1974

[54] MOUNT FOR CYLINDRICAL ROLL
[76] Inventor: Walter W. Barber, 31830 Trenor Ave., Hayward, Calif. 94514
[22] Filed: Apr. 13, 1973
[21] Appl. No.: 351,053

[52] U.S. Cl. ............................................... 242/68
[51] Int. Cl. .......................................... B65h 75/02
[58] Field of Search ....... 242/68, 68.4, 68.5, 129.51

[56] References Cited
UNITED STATES PATENTS
1,796,534  3/1931  Pope .................................. 242/68.4
3,018,977  1/1962  Skallguist ...................... 242/68.4 X Primary Examiner—John W. Huckert
Assistant Examiner—Edward J. McCarthy

[57] ABSTRACT

Mounting structure for each end of a cylindrical roll, such as a length of photographic film wound on a central, tubular core of a penetrable material, such as cardboard or the like. The structure comprises a generally circular flat plate having a central, circular projection on one face thereof. The projection is receivable within one end of the core and has lock means thereon accessible from the opposite face of the plate for releasably coupling the projection to the core. The plate, when attached to one end of the roll, can be supported on roller means, thereby allowing the roll to rotate about its central axis.

13 Claims, 6 Drawing Figures

MOUNT FOR CYLINDRICAL ROLL

This invention relates to improvements in the mounting of a cylindrical roll, such as the type having flexible photographic film wound on a central tubular core of cardboard and, more particularly, to an improved mount for each end of such a roll.

BACKGROUND OF THE INVENTION

In certain industrial-type cameras, the film for such a camera has a width in the range of 9 to 12 inches. Such film is supplied in a roll whose diameter typically is 6 to 8 inches. The film itself is wound on a cardboard core which is open at its ends and has a diameter of about 2 inches. For mounting in a camera, the roll has a pair of end plates of generally circular configuration, each end plate having a central, lateral projection which is press-fitted by machine into the corresponding end of the core with the circular outer peripheries of the end plates concentric to the central axis of the roll. Thus, the plates can rest on rollers and be rotated to allow the film to be removed from the roll or to be returned thereto.

The central projections of the end plates are press-fitted into the core to assure that the end plates are always concentric to the central axis of the roll. Otherwise, the film would eventually jam within the camera and the camera would have to be opened to re-position the end plates for proper rotation of the roll. This action would cause exposure of a certain amount of the film, thereby resulting in a loss of the same.

Since the projections on conventional end plates of the type described are press-fitted into the ends of the tube, the manufacturer of the roll must provide for this. The projections cannot generally be put into the tube ends by hand. This task must be done by machine. Thus, the manufacturer of the film roll must assure that the mounting plates are coupled to the roll before the latter is shipped to a customer. This requires additional packaging and shipping space which desirably should be avoided to minimize production and shipping costs.

SUMMARY OF THE INVENTION

The present invention is directed to an improved mounting for the end of a roll of the type described. To this end, the mount of this invention includes a circular mounting plate provided with improved lock means thereon which permit it to be releasably connected to a roll at the corresponding end thereof yet does not require it to be press-fitted into the end of the roll as is required with conventional mounting plates described above. Since the inner core of such a roll is generally of a penetrable material, such as cardboard or the like, the lock means of the present invention operates, when in use, to penetrate the core in a releasable fashion so that the lock means effectively grips or grasps the core, thereby connecting the mounting plate to the end of the roll. Moreover, the lock means is on the normally inner side of the mounting plate and is operable from the opposite or normally outer side thereof. Thus, the lock means can be quickly and easily connected or disconnected from the core.

The present mount utilizes a circular projection concentric to the central axis of the circular mounting plate. The lock means is carried on the normally inner end of the projection, the latter being received within the corresponding end of the roll core when the mount is coupled to the roll.

One form of the lock means comprises a pair of core-engaging members rotatably mounted on the projection at circumferentially spaced locations thereon. Each member has an outer peripheral, arcuate knife edge which, when the member is rotated, moves into penetrating relationship to the core. When both members penetrate the core, they lock the mount to the roll. The mounting plate itself has a knob on its outer side for each member to effect the manual rotation thereof. In the alternative, a single control could be provided to rotate both members simultaneously. Also, more than two members can be used, if desired.

The primary object of this invention is to provide an improved mount for one end of a generally cylindrical roll of the type having a central, tubular core wherein the mount has a circular mounting plate provided with lock means thereon for releasably securing the same to the core of the roll to thereby permit the mount to be quickly and easily connected to the roll with the outer peripheral margin of the mounting plate substantially concentric to the central axis of the roll.

Another object of this invention is to provide an improved mount of the type described wherein the mounting plate thereof has a central boss receivable within the roll core and provided with the lock means thereon, the lock means having manual controls exteriorly of the mounting plate so that the latter can be connected to or disconnected from the roll core as desired.

Another object of this invention is to provide a roll assembly of the type having a web or film wound on a central tubular core of penetrable material wherein the assembly includes a pair of opposed end mounts having central projections thereon removably received within respective ends of the core with each projection having lock means for penetrating the core and for effecting a releasable connection between the projection and the core with the circular outer periphery of the mount being substantially concentric to the central axis of the roll.

Other objects of this invention will become apparent as the following specification progresses, reference being had to the accompanying drawing for an illustration of the invention.

Figure 1:
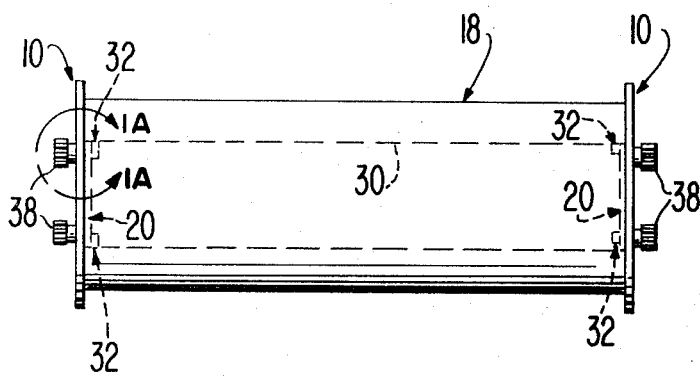
FIG. 1 is a side elevational view of a cylindrical roll having a pair of mounts of this invention on the ends thereof.

The amount of the present invention is broadly denoted by the numeral 10 and includes a rigid, circular plate 12 having a pair of opposed, flat faces 14 and 16.

Plate 12 is of a diameter greater than that of the cylindrical roll 18 to which it is to be mounted in the manner to be described. Plate 12 can be of any suitable material, such as plastic, metal or the like. Typically, the plate will be formed of aluminum.

A circular boss or projection 20 is secured to face 14 of plate 12 with the circular outer periphery of projection 20 concentric with the outer periphery of plate 12. Projection 20 is formed of a first section 22 contiguous to face 14 and a second section 24 integral with section 22 and spaced from face 14. Section 24 has an outer, cylindrical surface 26 whose diameter is less than that of section 22. Thus, sections 22 and 24 define an annular shoulder 28 at the junction thereof, the shoulder being in a plane parallel to the plane of face 14. Also, the diameter of surface 26 is such that it can be readily received within the open end of a central, tubular core 30 forming a part of roll 18.

Projection 20 has lock means thereon for releasably interconnecting it with core 30. Typically, the core will be of a penetrable material, such as cardboard, laminated paper or the like. The lock means includes a pair of locking members 32 which are rotatably mounted on the inner end face 34 of projection 20 at diametrically opposed locations thereon near outer peripheral surface 26 thereof. To this end, each locking member 32 has a shaft 36 rigid thereto and extending through and rotatable relative to projection 20 and plate 12. A knob 38 is rigid to the outer end of each shaft 36, respectively. Thus, by rotating the knob, the corresponding locking member 32 can be caused to rotate about the axis of its shaft 36.

Figure 1A:
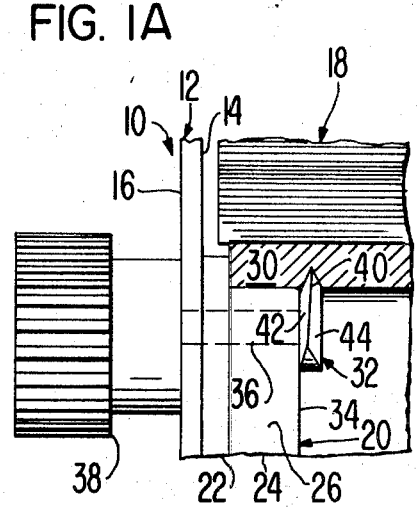
FIG. 1a is an enlarged, fragmentary, cross-sectional view taken along line 1a—1a of FIG. 1.
Figure 2:
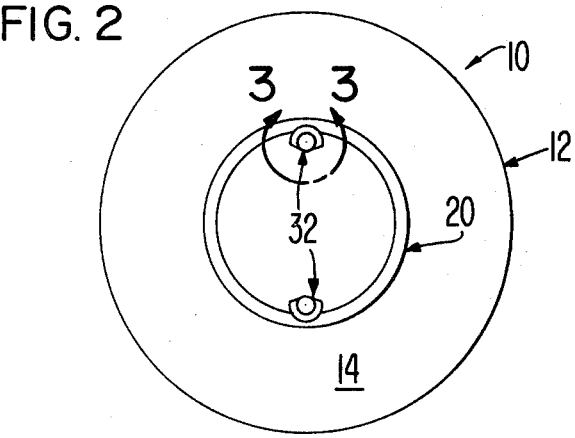
FIG. 2 is a side elevational view of one of the mounts.
Figure 3:
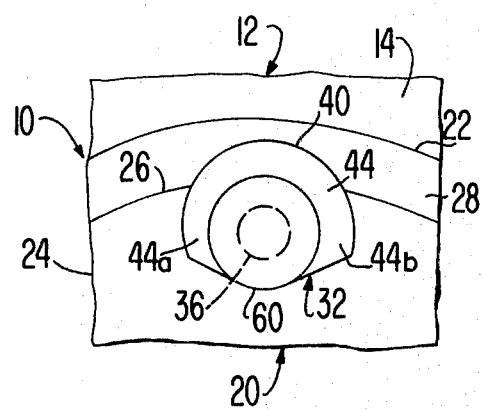
FIG. 3 is an enlarged, fragmentary, side elevational view taken along line 3—3 of FIG. 2 and showing a part of the lock mans on the inner portion of one of the mounts.

Each member 32 has an arcuate, outer peripheral knife edge 40 formed by the merging of two arcuate, beveled faces 42 and 44 (FIG. 1a). The arcuate length of edge 40 is about 200° (FIG. 3). The bevel on beveled faces 42 and 44 near each end thereof is such as to cause edge 40 to form a single screw flight (FIG. 1a) near such end. The purpose of this screw configuration is to cause mount 10 to be pulled slightly inwardly of core 30 until shoulder 28 abuts end face 46 of core 30 when a locking member penetrates core 30 upon rotation of the corresponding shaft 36. This is accomplished because edge 40 penetrates core 30 and, as it does so, it pulls plate 12 toward the core due to the screw configuration of edge 40. In this way, the plate is properly mounted on the roll and assurance is had that the circular outer periphery of plate 12 is symmetrical with respect to the central axis of the roll.

The screw configuration is provided at both end portions 44a and 44b of edge 40 (FIG. 3). Thus, the remaining portion of edge 40 between portions 40a and 40b is in a plane substantially parallel with the plane of plate 12. This permits each member 32 to enter core 30 from either end of edge 40.

While members 32 have been described as being independently rotatable, it is possible to connect members 32 or their shafts by a suitable linkage so that the members are rotated simultaneously into and out of locking relationship to core 30. Moreover, more than two members 32 can be used, if desired. In such a case, the angular spacing between the members would be less than 180°.

Figure 4:
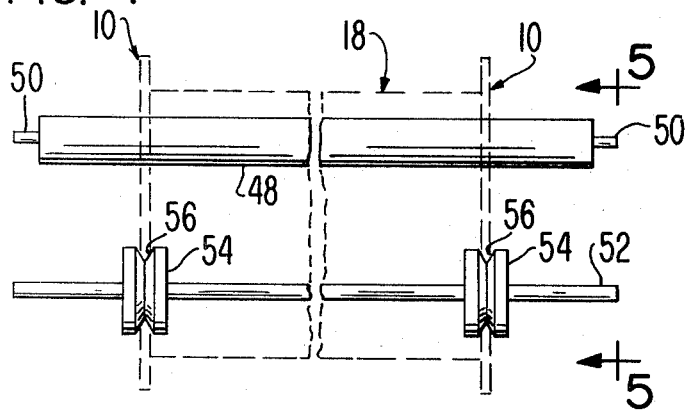
FIG. 4 is a top plan view of the support for the roll having the mounts coupled to the ends thereof.
Figure 5:
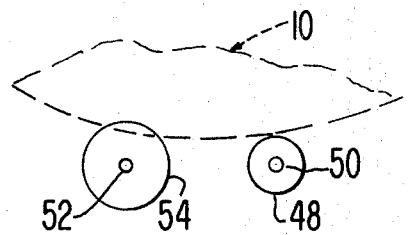
FIG. 5 is a fragmentary, side elevational view looking in the direction of line 5—5 of FIG. 4 and illustrating the way in which a mount is coupled to the support of FIG. 4.

A typical support in an industrial camera for carrying roll 18 with mounts 10 coupled to the ends thereof is illustrated in FIGS. 4 and 5 and includes a cylindrical roller 48 having a pair of end shafts 50 for mounting th same on a pair of sidewalls (not shown). A shaft 52 parallel to roller 48 is also rotatably mounted in the sidewalls and has a pair of pulley-like members 54 adjustably mounted thereon to accommodate rolls of different lengths. Each member 54 has a transversely V-shaped annular recess for receiving the mounting plate 12 of a corresponding mount 10. Thus, when the roll assembly of FIG. 1 is placed on roller 48 and members 54, plates 12 are received within recesses 56, thereby preventing lateral movement of roll 18 relative to roller 48 and shaft 52.

In operation, mounts 10 are coupled to roll 18 which initially is supplied with internal core 30 of a suitable penetrable material. Typically, roll 18 can comprise a roll of photographic film which is to be placed in a camera of the industrial type.

Mounts 10 are first made ready by rotating each member 32 thereof until the portion 60 (FIG. 3) remote from edge 40 is adjacent to outer periphery 26. This will allow the corresponding projection 20 to be inserted into the respective end of core 30. Each projection 20 is then inserted into the core until the corresponding shoulder 28 is near adjacent end face 46 of core 30. Then, knobs 38 are rotated, causing members 32 to penetrate core 30, pulling shoulders 28 into firm engagement with end faces 46 and thereby releasably interconnecting mounts 10 and roll 18. The assembly of the roll and mounting plates is then placed on the support of FIGS. 4 and 5 with plates 12 received within recesses 56 and member 54. Then, the film can be pulled off roll 18 as needed yet the end mounting plates 10 keep the roll properly oriented on the support. Moreover, the locking action of members 32 assures that mounts 10 are securely fixed at all times to roll 18 so that there is no danger of the roll working loose from either or both mounts.

Mounts 10 are reusable and, after the film has been used up from one roll 18, the mounts can be separated from core 30 of the used roll and inserted into the core of a new roll in the manner described above. Thus, the cost of manufacturing and marketing a roll of film is minimized because the roll does not have to have the press-fitted end plates heretofore required with conventional film rolls. Moreover, mounts 10 can be used on a roll of any length. Since members 54 of the aforesaid roll support are adjustable along shaft 52, this will permit rolls of different lengths to be used with a particular camera.

I claim:

1. A mount for a roll having a tubular, open end core of penetrable material comprising: a generally flat plate having a pair of opposed faces and a circular outer periphery, said plate having a projection secured to one face thereof; lock structure means mounting said lock structure on the projection in spaced relationship to said plate for movement into penetrating relationship to the core of said roll when said projection is inserted into one end of said core to thereby releasably couple the plate to said roll; and means accessible from the opposite face of said plate for moving said lock structure to cause the same to move into and out of penetrating relationship to said core.

2. A mount as set forth in claim 1, wherein said projection has a normally innermost face remote from the plate, said lock structure being mounted on said face near the outer periphery of the projection for rotation relative thereto.

3. A mount as set forth in claim 2, wherein said lock structure comprises a pair of spaced lock members rotatably mounted on said inner face, each lock member having a shaft rigid thereto and extending through the projection and the plate, the shafts defining said moving means.

4. A mount as set forth in claim 3, wherein each lock member has a pair of beveled, outer, peripheral, arcuate, relatively convergent surfaces defining an arcuate knife edge, said edge being movable into the core as the member is rotated relative to the projection.

5. A mount as set forth in claim 4, wherein a portion of each knife edge defines a screw flight.

6. A mount as set forth in claim 4, wherein the knife edge has a pair of opposed ends, the portion of each lock member between the ends of the knife edge thereof and remote from said edge having a transverse dimension permitting the corresponding projection to be inserted in and removed from said core without interference by said lock means.

7. A mount as set forth in claim 1, wherein the projection includes a pair of adjacent circular sections, one of the sections having a diameter greater than the other section to present an annular, flat shoulder at the junction therebetween, the shoulder being movable into engagement with the corresponding end face of the core as the lock means penetrates the core.

8. A mount as set forth in claim 1, wherein the diameter of the plate is greater than the diameter of the roll, the projection having a pair of adjacent circular sections, one of the sections having a diameter less than the other section, said one section adapted to be inserted into an end of the core, the other section having a diameter greater than the inside diameter of the core and provided with an annular, outer peripheral face defining a shoulder engageable with the adjacent end face of the core, said other section being rigidly secured to said one face of the plate.

9. A mount as set forth in claim 1, wherein said projection has a circular outer peripheral surface concentric to said outer periphery of the plate, said lock means being adjacent to said outer peripheral surface.

10. A roll assembly comprising: a tubular, open end core of penetrable material; a flexible web wound on the core to form a roll; and a pair of mounts for respective ends of the roll, each mount including a rigid, circular plate having a pair of opposed faces, a circular outer periphery, and a circular projection on one face thereof with said projection being concentric to said outer periphery, means mounted on the projection for movement into penetrating relationship to the core when the corresponding projection is inserted within one end thereof, and means accessible from a location near the opposite face of the plate for controlling the movement of the lock means thereof, the diameters of the plates being substantially equal to each other and being greater than that of said roll.

11. A roll assembly as set forth in claim 10, wherein the lock means of each mount comprises a pair of spaced locking members rotatably mounted on the corresponding projection, said control means including a shaft for each locking member, respectively, each shaft extending through the plate and the projection being rotatable relative thereto, and rigidly connected to the coresponding member, the outer end of each shaft adapted to be rotated to thereby rotate the corresponding member into and out of penetrating relationship to the core.

12. A roll assembly as set forth in claim 11, wherein each locking member has an outer peripheral knife edge, at least one portion of the knife edge defining a screw flight.

13. A mount for a roll having an open end comprising: a mounting plate; means on one face of the plate for forming a projection thereon, said projection adapted to be inserted into said open end of the roll; a pair of locking members, each member having an arcuate knife edge for penetrating the inner surface of the roll as the member is shifted relative to the projection, a portion of said knife edge forming a screw flight; and means mounting said locking members on said projection at spaced locations thereon for movement relative thereto into engagement with the roll to penetrate the inner surface thereof and to releasably lock the projection and thereby said plate to the roll when the projection is inserted therein.

* * * * *